US008279182B2

(12) United States Patent
Kim et al.

(10) Patent No.: US 8,279,182 B2
(45) Date of Patent: Oct. 2, 2012

(54) USER INPUT DEVICE AND METHOD USING FINGERPRINT RECOGNITION SENSOR

(75) Inventors: Hyun-Soo Kim, Suwon-si (KR); Dae-Hyun Sim, Seoul (KR); Jae-Chan Koh, Yongin-si (KR); In-Kwon Kang, Seoul (KR); Kwan-Sic Kim, Yongin-si (KR); Young-Shik Shin, Suwon-si (KR); Jin-Choul Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 709 days.

(21) Appl. No.: 11/768,715

(22) Filed: Jun. 26, 2007

(65) Prior Publication Data

US 2008/0042983 A1 Feb. 21, 2008

(30) Foreign Application Priority Data

Jun. 27, 2006 (KR) .................. 10-2006-0058340

(51) Int. Cl.
*G06F 3/041* (2006.01)
*G06K 9/00* (2006.01)
(52) U.S. Cl. ...................... 345/173; 382/124
(58) Field of Classification Search .......... 345/156–178; 382/124
See application file for complete search history.

(56) References Cited

U.S. PATENT DOCUMENTS

| | | | | |
|---|---|---|---|---|
| 6,073,036 A | * | 6/2000 | Heikkinen et al. | 455/550.1 |
| 6,219,793 B1 | | 4/2001 | Li et al. | |
| 6,792,287 B1 | * | 9/2004 | Tuomela et al. | 455/556.1 |
| 7,020,270 B1 | * | 3/2006 | Ghassabian | 379/368 |
| 2004/0085300 A1 | * | 5/2004 | Matusis | 345/173 |
| 2005/0041841 A1 | | 2/2005 | Yoo et al. | |
| 2005/0143108 A1 | * | 6/2005 | Seo et al. | 455/466 |
| 2005/0169503 A1 | * | 8/2005 | Howell et al. | 382/115 |
| 2005/0207626 A1 | * | 9/2005 | Kang et al. | 382/124 |
| 2006/0176284 A1 | * | 8/2006 | Cheng | 345/173 |
| 2006/0181521 A1 | * | 8/2006 | Perreault et al. | 345/173 |
| 2007/0273658 A1 | * | 11/2007 | Yli-Nokari et al. | 345/173 |

FOREIGN PATENT DOCUMENTS

| | | |
|---|---|---|
| JP | 2002-007335 | 1/2002 |
| JP | 2006-086998 | 3/2006 |
| KR | 1020030035226 | 5/2003 |
| KR | 1020050094223 | 9/2005 |
| KR | 1020060003689 | 1/2006 |
| KR | 1020060131544 | 12/2006 |

* cited by examiner

*Primary Examiner* — Amare Mengistu
*Assistant Examiner* — Hong Zhou
(74) *Attorney, Agent, or Firm* — The Farrell Law Firm, P.C.

(57) ABSTRACT

Disclosed are a user input device and a method for rapidly selecting an operation mode in a mobile terminal having a touch screen input panel and a fingerprint recognition sensor. The user input method includes setting operation modes for at least one fingerprint data and input pattern, each comprised of keys necessary to implement a corresponding operation mode; detecting fingerprint data inputted from the fingerprint recognition sensor, and confirming an operation mode set for the inputted fingerprint data; and displaying an input pattern corresponding to the confirmed operation mode on the touch screen input panel.

13 Claims, 5 Drawing Sheets

| FIRST TEXT INPUT SECTION | | | | SECOND TEXT INPUT SECTION | | | | THIRD TEXT INPUT SECTION | | | |
|---|---|---|---|---|---|---|---|---|---|---|---|
| 1 | 2 | 3 | 4 | 5 | 6 | 7 | 8 | 9 | 0 | # | ✸ |
| Q | W | E | R | T | Y | U | I | O | P | [ | ] |
| A | S | D | F | G | H | J | K | L | ; | ' | . |
| Z | X | C | V | B | N | M | ← | ↓ | ↑ | ← | → |

USER INPUT DEVICE AND METHOD USING FINGERPRINT RECOGNITION SENSOR

PRIORITY

This application claims priority to an application filed with the Korean Intellectual Property Office on Jun. 27, 2006 and assigned Serial No. 2006-0058340, the entire disclosure of which is hereby incorporated by reference.

BACKGROUND OF THE INVENTION

1. Field of the Invention

The present invention generally relates to a user input device and method, and in particular, to a user input device and method in a mobile terminal having a touch screen and a fingerprint recognition sensor.

2. Description of the Related Art

Generally, a user input unit of a handheld device, such as a mobile communication terminal, is comprised of a keypad. Users can input data by directly pressing button keys provided on a keypad or using a touch screen. Data input using a touch screen can be soft keyboard input or handwriting recognition. A soft keyboard is an on-screen keyboard generated on a touch screen, which enables a user to input data using a digital pen. The soft keyboard overcomes the lack of portability of general input devices, i.e. keyboard and mouse. A handwriting recognition software allows a user to provide input by writing on a touch screen. It recognizes the user's handwriting and converts the handwriting input into a data code. Mobile terminals, such as electronic schedulers, mobile phones and PDAs, are generally provided with a touch screen.

Users can select a specific operation mode, such as a call mode or a text input mode, under a mode menu displayed on the touch screen, and input numbers, characters or special characters to implement the selected operation mode. In other words, a general operation mode can be selected by a number of key inputs for selecting a menu and a sub-menu corresponding to the mode. Even a frequently used operation mode can be selected in the same manner. A more rapid and simplified method for selecting a desired operation mode is highly demanded.

Due to the trend toward small designs, a touch screen provided on a mobile terminal is also becoming smaller with reduced size of a soft keyboard. Users may select a desired operation mode and input a telephone number or a text message in the selected mode using the soft keyboard displayed on the small touch screen. Every key of the soft keyboard has a small size, for example, 4×4 mm, to be displayed on the small touch screen. Users may have some difficulty using the small-sized keys of the soft keyboard accurately. They may often press a wrong key during the input of data. Since all keys for inputting characters, numbers and special characters/symbols are provided on the soft keyboard, an actual area of displaying the inputted data is inevitably reduced. Also, terminals with a large number of keys displayed on the soft keyboard may go against the demand for small designs.

SUMMARY OF THE INVENTION

Accordingly, the present invention has been made to solve the above-mentioned problems occurring in the prior art, and an aspect of the present invention is to provide a user input device and method for rapidly selecting an operation mode frequently used in a mobile terminal having a touch screen.

Another aspect of the present invention is to provide a user input device and method for displaying an input pattern comprised of only the keys necessary to implement an operation mode selected in a mobile terminal having a touch screen in order to minimize the size of a touch screen input panel.

In accordance with one aspect of the present invention for accomplishing the above objects, there is provided a user input device in a mobile terminal having a touch screen, which includes: a user interface having a touch screen input panel for outputting a key signal corresponding to a user's input; an information display unit for displaying inputted data; a fingerprint recognition sensor for outputting fingerprint data corresponding to a fingerprint pattern of a finger that touches the surface thereof and fingerprint direction data showing a detected fingerprint input direction; a memory for storing operation modes set for at least one fingerprint data and input patterns, each comprised of keys necessary to implement a corresponding operation mode; and a control unit for detecting fingerprint data inputted from the fingerprint recognition sensor, confirming an operation mode set for the inputted fingerprint data, reading an input pattern corresponding to the operation mode from the memory, and displaying the input pattern on the information display unit.

In accordance with another aspect of the present invention, there is provided a user input method in a mobile terminal having a touch screen input panel and a fingerprint recognition sensor, which includes: setting operation modes for at least one fingerprint data and input patterns, each comprised of keys necessary to implement a corresponding operation mode; detecting fingerprint data inputted from the fingerprint recognition sensor, and confirming an operation mode set for the inputted fingerprint data: and displaying an input pattern corresponding to the confirmed operation mode on the touch screen input panel.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted for clarity and conciseness.

The present invention provides a user input device and method for displaying an input pattern corresponding to an operation mode, which has been set for a fingerprint recognized, on a touch screen input panel of a mobile terminal. In other words, the user input device and method according to the present invention display different input patterns according to the different fingerprint patterns of a user. Also, the present invention divides a soft keyboard into multiple text input sections, and displays only one of the multiple text input sections as an input pattern for a text input mode. If a fingerprint is inputted in a specific direction during the display of a text input section, then another text input section corresponding to the fingerprint input direction will be displayed on the touch screen input panel.

Figure 1:
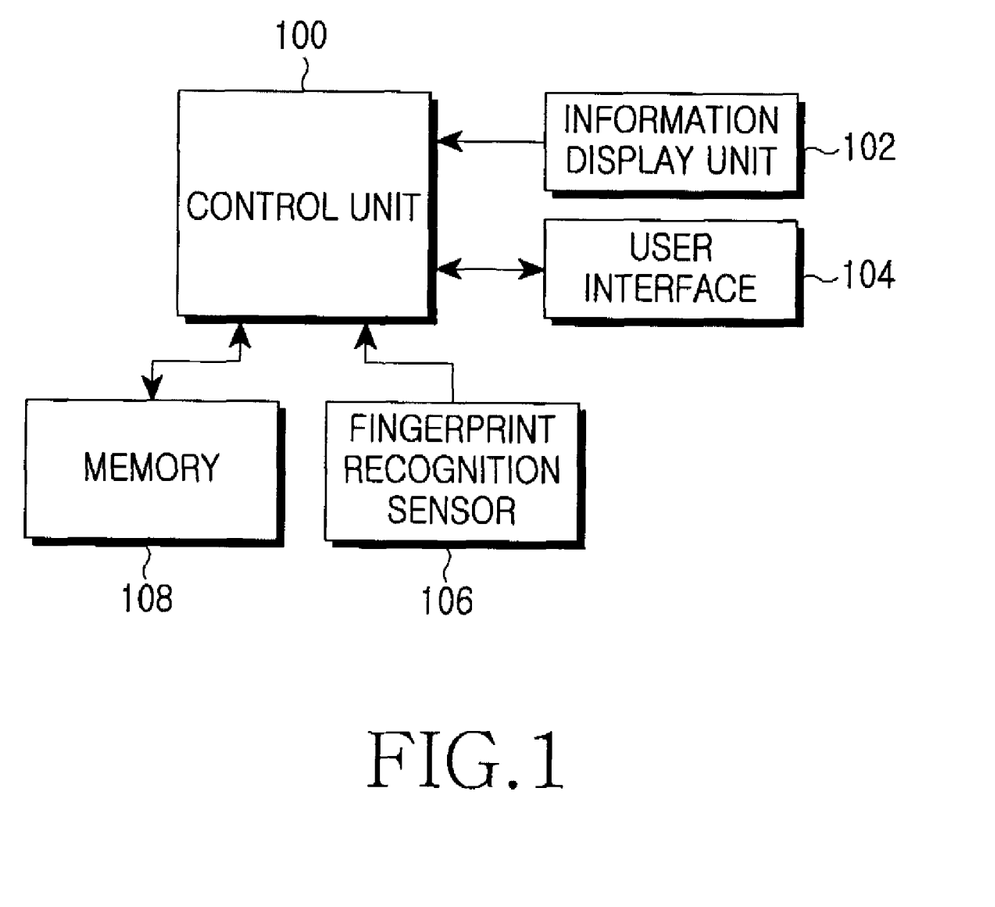
FIG. 1 is a block diagram of a mobile terminal having a touch screen and a fingerprint recognition sensor according to the present invention.

FIG. 1 is a block diagram showing the configuration of a mobile terminal having a touch screen and a fingerprint recognition sensor according to the present invention. Referring to FIG. 1, the mobile terminal includes a control unit 100, an information display unit 102, a user interface 104, a fingerprint recognition sensor 106 and a memory 108.

The control unit 100 controls various functions, such as telephone calls and data communication, in the mobile terminal. It also processes and controls a user input function implemented with fingerprint recognition according to the present invention. The operation of the control unit 100 will be explained in more detail with reference to FIGS. 2 and 3.

Under the control of the control unit 100, the information display unit 102 displays images received or stored in the memory 108, as well as images representing various operational information provided from the control unit 100. As the mobile terminal has a touch screen according to the present invention, the user interface 104 is comprised of a touch screen input panel. The user interface 104 outputs a key signal corresponding to a key selected by a user to the control unit 100. Hereinafter, the terms "user interface" and "touch screen input panel" will be used interchangeably to have the same meaning.

The fingerprint recognition sensor 106 generates fingerprint image data corresponding to the user's fingerprint pattern in accordance with the amount of current change as a result of the touch of the finger. The fingerprint recognition sensor 106 also detects the fingerprint input direction and outputs the fingerprint direction data to the control unit 100. The fingerprint recognition sensor 106 has an array in form of a lattice with x and y axes on the outer surface thereof so that it can generate coordinate data based on the x and y coordinate values which change with the movement of the finger and detect the fingerprint input direction simultaneously. The fingerprint input direction detected by the fingerprint recognition sensor 106 is a direction in which the user moves the finger to input the fingerprint. The direction can be west, east, north, south, northeast, northwest, southeast or southwest (i.e. the cardinal directions). Fingerprint inputs in different directions can implement the same functions as the different direction keys.

The memory 108 stores programs for any processing or control by the control unit 100, reference data and various updateable data to serve as a working memory for the control unit 100. Also, the memory 108 stores fingerprint input menu program data, fingerprint input mode program data, information on the user's fingerprint patterns, operation modes set for the fingerprint patterns, and input patterns corresponding to the respective operation modes. For example, different operation modes, such as a call mode, a text input mode and a camera mode, can be set respectively for the fingerprint patterns of the user's thumb, index finger and middle finger. The fingerprint input mode refers to a mode for analyzing fingerprint data inputted from the fingerprint recognition sensor 106 and selecting a preset operation mode corresponding to the inputted fingerprint data. An input pattern refers to a soft keyboard comprised of only the keys necessary to implement a specific operation mode.

Figure 4A:
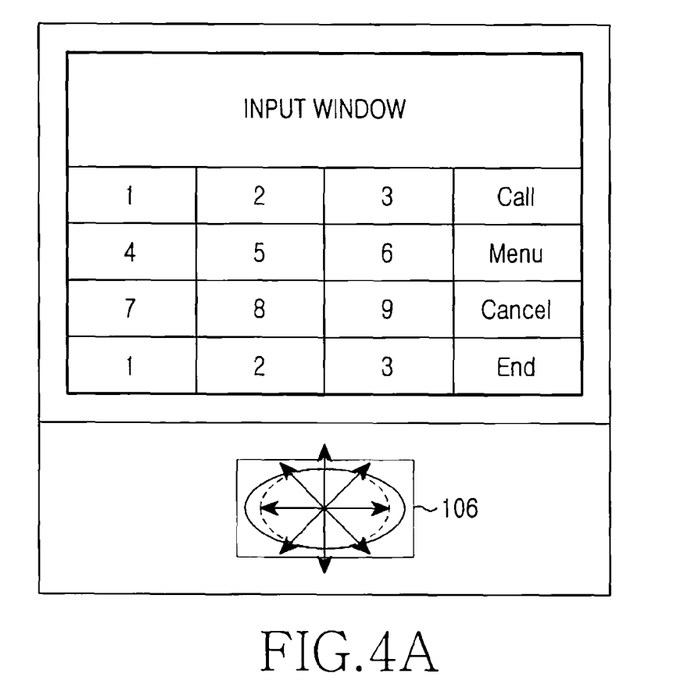
FIG. 4A illustrates an input pattern displayed when a call mode is selected with fingerprint recognition according to a preferred embodiment of the present invention
Figure 4B:
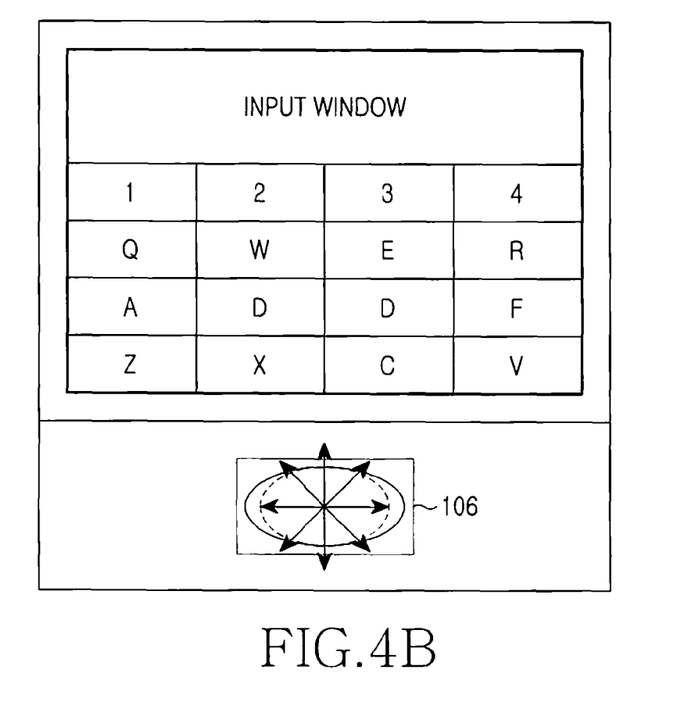
FIG. 4B illustrates an input pattern displayed when a text input mode is selected with fingerprint recognition according to a preferred embodiment of the present invention.
Figure 5A:
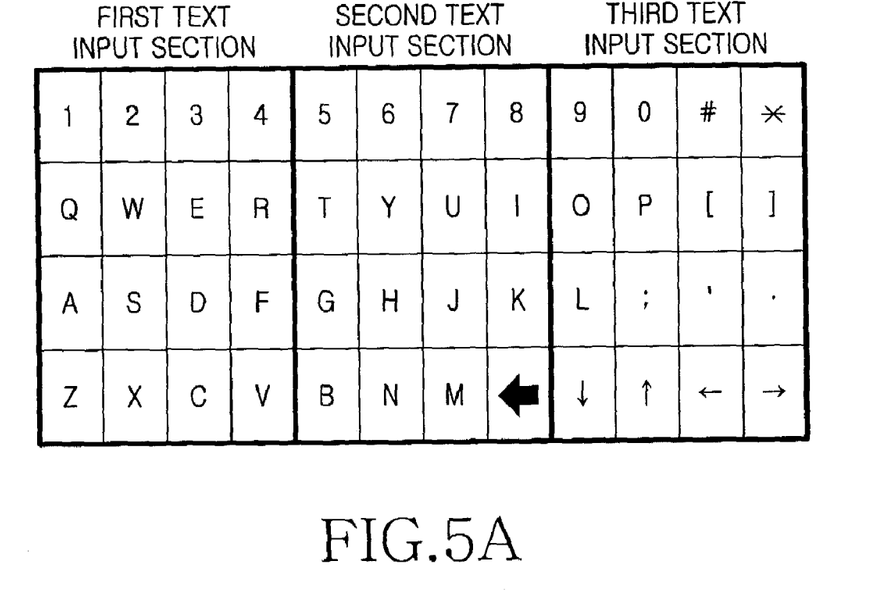
FIG. 5A illustrates a soft keyboard divided into three text input sections according to a preferred embodiment of the present invention.

According to the present invention, a fingerprint registration menu is provided to set an operation mode corresponding to the user's fingerprint data. The fingerprint registration menu implements a shortcut function corresponding to the user's fingerprint data inputted from the fingerprint recognition sensor 106. For example, the fingerprint registration menu can be set to implement the call mode when fingerprint data of the thumb is inputted or the text input mode when fingerprint data of the index finger is inputted. The memory 108 stores different input patterns for the respective operation modes, such as call mode and text input mode. For example, an input pattern for the call mode can be comprised of number keys necessary to make a telephone call as illustrated in FIG. 4A. An input pattern for the text input mode can be comprised of alphabetic characters necessary to input text as illustrated in FIG. 4B. It is assumed that the input pattern for the text input mode has a QWERTY keyboard layout. A full QWERTY keyboard is generally displayed on the screen in the text input mode. However, according to the present invention, a QWERTY keyboard is divided into three sections, one of which can be selected and displayed on the touch screen panel, in consideration of the screen size of a general mobile terminal and in order to increase the accuracy of a key input on the touch screen input panel. The memory 108 also stores a program for analyzing fingerprint data generated from the fingerprint recognition sensor 106 and determining the fingerprint image inputted by the user and the input direction of the fingerprint image. The memory 108 also stores a soft keyboard divided into at least two text input sections (for example, into a first input section, a second input section and a third input section as illustrated in FIG. 5A). Although three text input sections will be explained as a preferred embodiment of the present invention, the soft keyboard can be divided into at least two text input sections.

Figure 2:
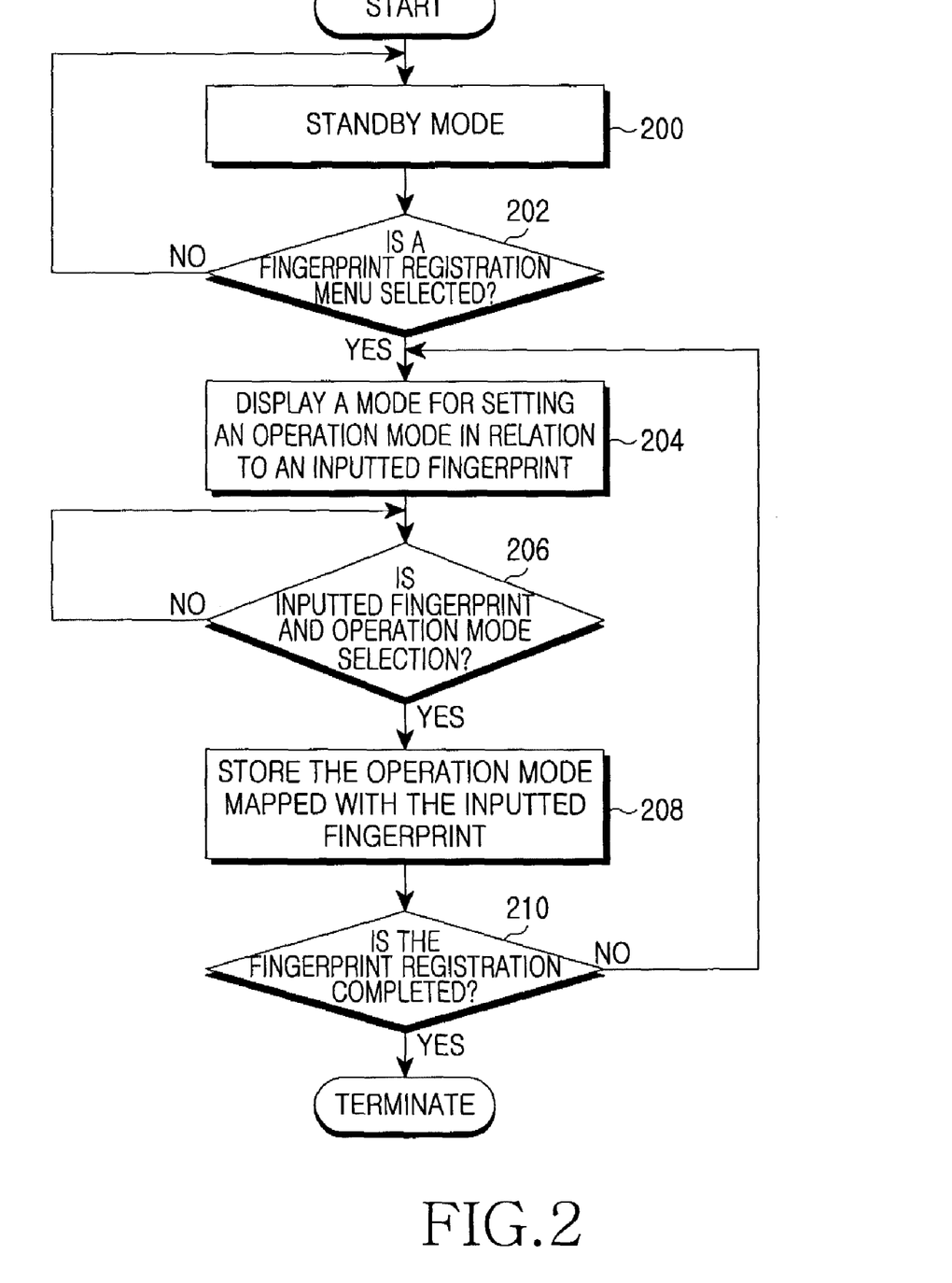
FIG. 2 is a flowchart showing a process of setting an operation mode in relation to each fingerprint pattern and an input pattern corresponding to the operation mode according to a preferred embodiment of the present invention.

Hereinafter, a process of setting an operation mode with recognition of a fingerprint according to the present invention will be explained in detail with reference to FIG. 2.

In step 200, a standby mode, the control unit 100 determines whether the user has selected the fingerprint registration menu for setting an operation mode according to the user's fingerprint in step 202. When the user selects the fingerprint registration menu, the control unit 100 displays a mode for inputting a fingerprint and selecting an operation mode, which will be registered in relation to the fingerprint, on the information display unit 102 in step 204. Then, the control unit 100 determines whether fingerprint data generated upon the user's fingerprint input has been inputted from the fingerprint recognition sensor 106 and whether an operation mode, which will be registered in relation to the inputted fingerprint data, has been selected by the user in step 206. The control unit 100 maps the inputted fingerprint data to the selected operation mode, and stores the operation mode in relation to the fingerprint data in the memory 108 in step 208. If the user inputs a key to terminate the fingerprint registration process in step 210, the control unit terminates the process. Otherwise, the control unit 100 proceeds to step 204 in order to repeat the fingerprint registration process for setting another operation mode according to the user's fingerprint. Through the process in FIG. 1 explained above, the user can input different fingerprint patterns of the thumb, index finger and middle finger, and set different operation modes, such as a call mode, a text input mode and a camera mode, in relation to the respective fingerprint patterns of the thumb, index finger and middle finger.

After setting various operation modes in relation to the user's fingerprint patterns, the mobile terminal can display an input pattern corresponding to a preset operation mode with recognition of a specific fingerprint pattern. This process will be explained with reference to FIG. 3.

In step 300, the standby mode, the control unit 100 determines whether the user has inputted a key to enter a fingerprint input mode in step 302. When the key is inputted, the control unit 100 determines whether fingerprint data has been inputted from the fingerprint recognition sensor 106 in step 304. To be specific, when the user's finger touches the surface of the fingerprint recognition sensor 106, the fingerprint recognition sensor 106 generates fingerprint data corresponding to the recognized fingerprint, and sends the fingerprint data to the control unit 100. Upon receiving the fingerprint data from the fingerprint recognition sensor 106, the control unit 100 searches the memory 106 to detect an operation mode set for the received fingerprint data in step 306. The control unit 100 then displays an input pattern corresponding to the detected operation mode on the information display unit 102 in step 308. For example, if the call mode is detected, the control unit 100 will display an input pattern comprised of only the keys necessary to implement the call mode as illustrated in FIG. 4A. If the text input mode is detected, the control unit 100 will display an input pattern comprised of only the keys necessary to implement the text input mode as illustrated in FIG. 4B. The input pattern for the text input mode can be a soft keyboard divided into at least two text input sections (for example, into a first input section, a second input section and a third input section as illustrated in FIG. 5A). If the text input mode is detected in step 306, one of the three text input sections, i.e. first input section, will be displayed on the information display unit 102.

Figure 3:
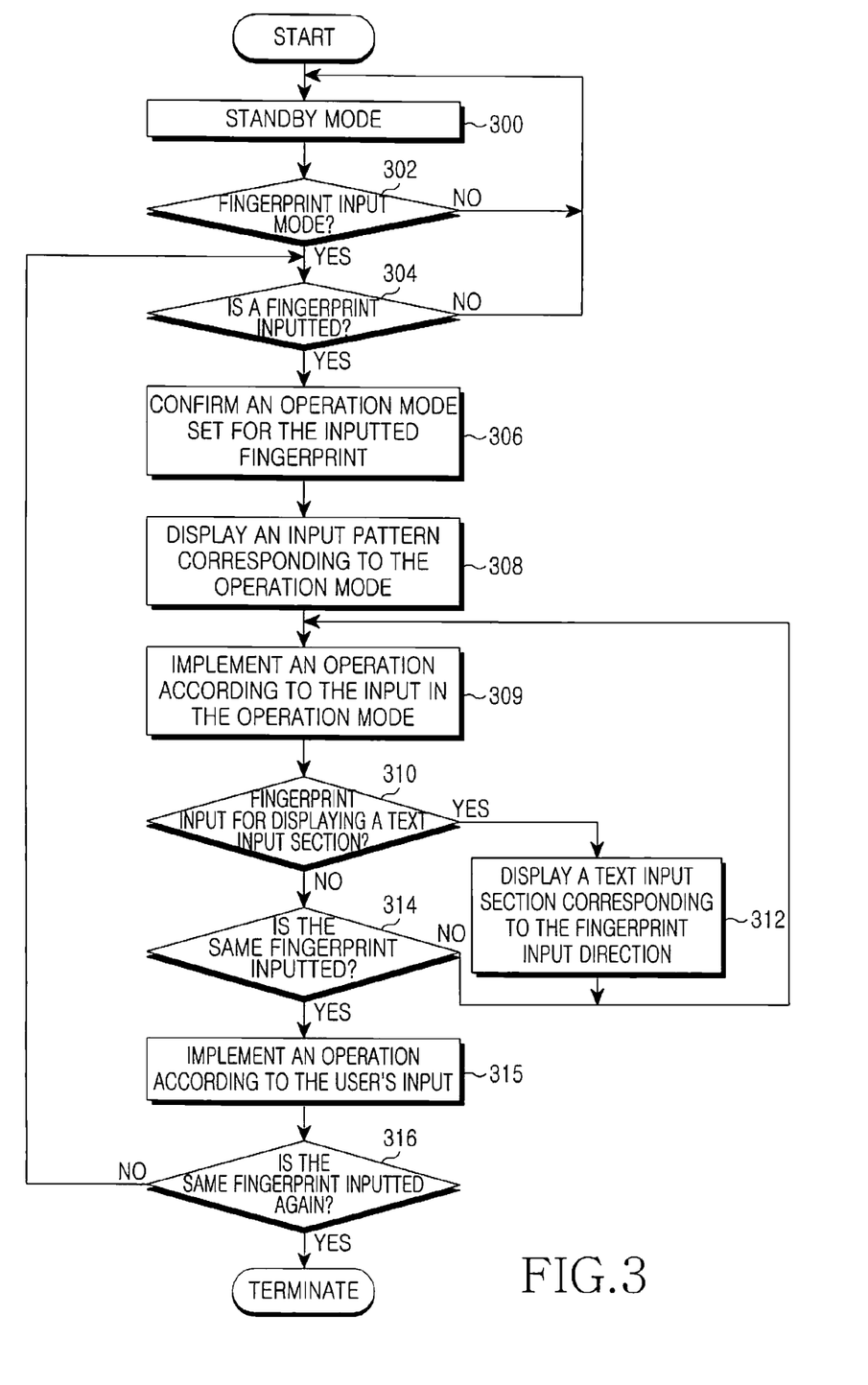
FIG. 3 is a flowchart showing a process of outputting an input pattern corresponding to a preset operation mode with recognition of a fingerprint pattern and a fingerprint input direction according to a preferred embodiment of the present invention.

The control unit 100 implements an input function in the detected operation mode in step 309. In other words, the control unit 100 recognizes a signal, i.e. a number or a character, input by the user through the user interface 104 and displays the number or character on the information display unit 102. At this time, the user can directly touch a desired number or character on the user interface 104. Alternatively, the user can select a desired number or character using a direction function of the fingerprint recognition sensor 106. To input a desired number or character using the direction function, the user has to move a finger to the east, west, south or north on the user interface 104. Input by a direct touch on the user interface, i.e. touch screen input panel, can be either a stroke-key-down method that inputs a number or character when the user's finger touches down on the number or character, or a stroke-key-up method that inputs a number or character when the user takes off the finger touching the number or character. The stroke-key-down method is advantageous in a small-sized touch screen panel.

The control unit 100 detects whether a fingerprint is inputted to implement the direction function in step 310. In other words, the control unit 100 detects whether fingerprint direction information is input from the fingerprint recognition sensor 106. If a fingerprint is input to select a specific direction in step 310, the control unit 100 will proceed to step 312. Otherwise, the control unit 100 will proceed to step 314. In step 312, the control unit 100 displays a text input section corresponding to the fingerprint input direction. The user can input a fingerprint, moving the finger to the northeast, northwest, southeast or southwest. Then, the control unit 100 will display a text input section corresponding to the fingerprint input direction. If the fingerprint is input to the fingerprint recognition sensor 106 at a contact pressure level lower than a predetermined level, the control unit 100 will recognize the fingerprint input as a direction key for selecting a specific number or character, and will implement the text input function. If the fingerprint is input at a contact pressure level higher than the predetermined one, the control unit 100 will recognize the fingerprint input as a direction key for displaying a specific text input section, and will display a corresponding text input section.

Figure 5B:
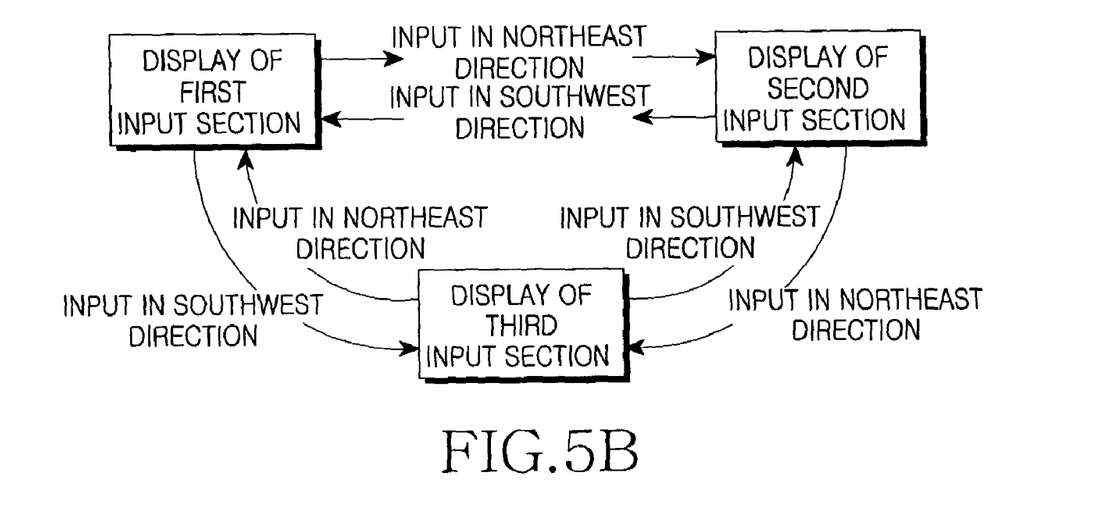
FIG. 5B is a view for explaining how to select and change a text input section of a soft keyboard according to a preferred embodiment of the present invention.

According to a preferred embodiment of the present invention, the user can select a desired text input section by moving the finger to the northeast, northwest, southeast or southwest on the touch screen input panel. Referring to FIG. 5, if the user moves the finger to the northeast on the touch screen input panel during the display of the first text input section, the second text input section will be displayed on the input panel. If the user moves the finger to the southwest during the display of the first text input section, the third text input section will be displayed. If the user moves the finger to the northeast during the display of the second text input section, the third text input section will then be displayed. If the user moves the finger to the southwest during the display of the second text input section, the first text input section will be displayed. If the user moves the finger to the northeast during the display of the third text input section, the first text input section will be displayed. If the user moves the finger to the southwest during the display of the third text input section, the second text input section will be displayed.

Although three text input sections have been explained in a preferred embodiment of the present invention, the soft keyboard (touch screen input panel) can be divided into at least two text input sections. In addition, although northeast and southwest directions of fingerprint input have been explained above, northwest and southeast directions can be set to select a text input section. As explained above, not the entire soft keyboard but only one of multiple text input sections of the soft keyboard is displayed. The user can select another text input section by inputting the fingerprint in a preset direction. It is possible to adjust the size of each key by adjusting the number of text input sections.

The control unit 100 determines whether the same fingerprint data as inputted in step 304 to select an operation mode is inputted from the fingerprint recognition sensor 106 in step 314. If the same fingerprint data is inputted, the control unit 100 will perform an operation, such as an outgoing call or a text message transmission, according to the numbers or characters inputted by the user in the operation mode detected in step 309. If the detected operation mode is the text input mode, a telephone number should be inputted to send an inputted text message. Therefore, when the same fingerprint data inputted to select the operation mode is inputted, the control unit 100 temporarily stores the currently inputted text message and displays the input pattern as illustrated in FIG. 4A on the touch screen input panel so that the user can input an intended recipient's telephone number. When the same fingerprint data is inputted again, the control unit 100 then sends the temporarily stored text message to the inputted telephone number.

The control unit 100 determines whether the same fingerprint data as inputted in step 304 to select the operation mode is inputted from the fingerprint recognition sensor 106 in step 316. If the same fingerprint data is inputted, the control unit 100 will then terminate the fingerprint input mode. Otherwise, the control unit 100 will repeat step 304 to continue the fingerprint input mode.

As explained above, the user input device and method according to the present invention set different operation modes for the respective fingerprint patterns of the user's fingers, thereby enabling the user to select a desired operation mode rapidly by inputting a fingerprint through the fingerprint recognition sensor. The present invention can reduce the size of the touch screen input panel by displaying an input pattern comprised of only the keys necessary to implement the selected operation mode.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A user input device in a mobile terminal having a touch screen, comprising:
    a user interface having a touch screen input panel for outputting a key signal corresponding to a user's input;
    an information display unit for displaying input data;
    a fingerprint recognition sensor for outputting fingerprint data corresponding to a fingerprint pattern of a finger that touches a surface of the fingerprint recognition sensor and fingerprint direction data including a detected cardinal direction corresponding to a fingerprint input trace generated by movement of the finger;
    a memory for storing a plurality of operation modes, a plurality of input patterns and a plurality of fingerprint data on the user's fingerprint patterns, wherein each of the plurality of fingerprint data corresponds to an operation mode, each of the plurality of operation modes corresponds to an input pattern, and each of the plurality of input patterns includes keys necessary to implement the corresponding operation mode; and
    a control unit for detecting the fingerprint data input from the fingerprint recognition sensor, confirming an upcoming operation mode corresponding to the input fingerprint data, reading from the memory a current input pattern corresponding to the upcoming operation mode, and displaying the current input pattern on the information display unit,
    wherein, if first fingerprint data corresponding to an operation mode is the same as second fingerprint data input from the fingerprint recognition sensor, the control unit implements the selected operation mode according to one of a character and a number later entered by the user.

2. The user input device according to claim 1, wherein said control unit initiates an outgoing call to a telephone number input by the user after said control unit confirms that first a call mode is set by the second fingerprint data, and the second fingerprint data is the same as a third fingerprint data currently input from the fingerprint recognition sensor.

3. The user input device according to claim 2, wherein said control unit terminates a fingerprint input mode when the first fingerprint data is input again after implementation of the selected operation mode.

4. The user input device according to claim 1, wherein said control unit temporarily stores text currently input by the user after said control unit confirms that first a text input mode is set by the second fingerprint data and the second fingerprint data is the same as a third fingerprint data currently input from the fingerprint recognition sensor, displays an input pattern for the user to enter a recipient's telephone number, and sends the temporarily stored text to the recipient's telephone number when the third fingerprint data is input again.

5. The user input device according to claim 4, wherein said control unit terminates a fingerprint input mode when the first fingerprint data is input again after implementation of the selected operation mode.

6. The user input device according to claim 1, wherein said memory stores a soft keyboard as an input pattern comprising keys necessary to input characters in a text input mode, the soft keyboard being divided into at least two text input sections.

7. The user input device according to claim 6, wherein said control unit displays an initial text input section of the at least two text input sections on the information display unit after said control unit confirms that the text input mode is set by the first fingerprint data.

8. The user input device according to claim 7, wherein if said control unit detects a fingerprint direction data inputted from the fingerprint recognition sensor after displaying the initial text input section, then said control unit changes the initial text input section to an other text input section of the at least two text input sections, the other text input section corresponding to the input fingerprint direction data.

9. A user input method in a mobile terminal having a touch screen input panel and a fingerprint recognition sensor, comprising:
    setting a plurality of operation modes, wherein a plurality of input patterns, a plurality of fingerprint data on a user's fingerprint patterns, and the operation modes are stored in the mobile terminal, wherein each of the plurality of fingerprint data corresponds to an operation mode, each of the plurality of operation modes corresponds to an input pattern, and each of the plurality of input patterns includes keys necessary to implement the corresponding operation mode;
    detecting one of the plurality of fingerprint data corresponding to the user's fingerprint patterns and fingerprint direction data including a detected cardinal direction corresponding to a fingerprint input trace generated by movement of a finger, input from the fingerprint recognition sensor, and confirming an operation mode set by the input fingerprint data;
    displaying an input pattern corresponding to the confirmed operation mode on the touch screen input panel; and
    if first fingerprint data corresponding to an operation mode is the same as second fingerprint data input from the fingerprint recognition sensor, implementing the selected operation mode according to one of a character and a number later entered by the user.

10. The user input method according to claim 9, wherein implementing the selected operation mode comprises:
    confirming that a call mode is set by the second fingerprint data; and
    initiating an outgoing call to a telephone number input by the user when the second fingerprint data is same as a third fingerprint data currently input from the fingerprint recognition sensor.

11. The user input method according to claim 10, further comprising terminating a fingerprint input mode when the first fingerprint data is input again after implementation of the selected operation mode.

12. The user input method according to claim 9, wherein implementing the selected operation mode comprises:
    confirming that a text input mode is set by the second fingerprint data;

storing temporarily text currently input by the user when the second fingerprint data is same as a third fingerprint data currently input from the fingerprint recognition sensor;
displaying an input pattern for the user to enter a recipient's telephone number; and
sending the temporarily stored text to the recipient's telephone number when the third fingerprint data is inputted again.

13. The user input method according to claim 12, further comprising terminating a fingerprint input mode when the first fingerprint data is input again after implementation of the selected operation mode.

* * * * *